United States Patent
Lai et al.

(10) Patent No.: US 9,992,566 B2
(45) Date of Patent: Jun. 5, 2018

(54) WIRELESS JOINT AND WIRELESS MICROPHONE HAVING SAME

(71) Applicant: HON HAI PRECISION INDUSTRY CO., LTD., New Taipei (TW)

(72) Inventors: Chun-Hung Lai, New Taipei (TW); Wen-Liang Tseng, New Taipei (TW); Meng-Feng Kuo, New Taipei (TW); Chih-Chun Chang, New Taipei (TW); Kuo-Chun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/243,983

(22) Filed: Aug. 23, 2016

(65) Prior Publication Data
US 2017/0188124 A1 Jun. 29, 2017

(30) Foreign Application Priority Data
Dec. 28, 2015 (CN) .................................. 104143930

(51) Int. Cl.
*H04B 3/00* (2006.01)
*H04R 1/08* (2006.01)
*H04B 7/26* (2006.01)
*H04B 10/114* (2013.01)

(52) U.S. Cl.
CPC ................. *H04R 1/08* (2013.01); *H04B 7/26* (2013.01); *H04B 10/1141* (2013.01); *H04R 2420/07* (2013.01)

(58) Field of Classification Search
CPC ........ H04R 1/08; H04R 2420/07; H04B 7/26; H04B 10/1141
See application file for complete search history.

(56) References Cited

U.S. PATENT DOCUMENTS

| | | | | |
|---|---|---|---|---|
| 4,815,143 A * | 3/1989 | Derhaag | .................. | H01H 9/06 200/332.2 |
| 4,910,795 A * | 3/1990 | McCowen | ............. | H04R 1/083 381/355 |
| 9,686,601 B1 * | 6/2017 | Jia | ......................... | G03B 17/563 |
| 2009/0104940 A1 * | 4/2009 | Seshadri | ................. | H04M 1/05 455/563 |
| 2015/0245134 A1 * | 8/2015 | Liu | .......................... | H04R 1/08 381/334 |
| 2016/0142802 A1 * | 5/2016 | Naito | ....................... | H04R 1/04 381/361 |

\* cited by examiner

*Primary Examiner* — Andrew L Sniezek
(74) *Attorney, Agent, or Firm* — ScienBiziP, P.C.

(57) ABSTRACT

A wireless joint includes a converter, a radio frequency (RF) device, and a connector. The converter realizes a conversion between an audio signal and a wireless signal. The RF device receives and transmits the wireless signal. The connector connects with a microphone body.

13 Claims, 5 Drawing Sheets

WIRELESS JOINT AND WIRELESS MICROPHONE HAVING SAME

FIELD

The subject matter herein generally relates to a wireless joint and a microphone having the wireless joint.

BACKGROUND

A wired microphone includes a microphone body and a cable removable connected to the microphone. A cable joint is connected at an end of the cable. The microphone body includes an interface. The cable joint and the interface electrically contact with each other. A wireless microphone has a general integral structure. Voice signals and control signals can be transmitted wirelessly by the wireless microphone. Because of a convenience of the wireless microphone, the wired microphone is gradually replaced by the wireless microphone.

BRIEF DESCRIPTION OF THE DRAWINGS

Implementations of the present technology will now be described, by way of example only, with reference to the attached figures.

DETAILED DESCRIPTION

Figure 1:
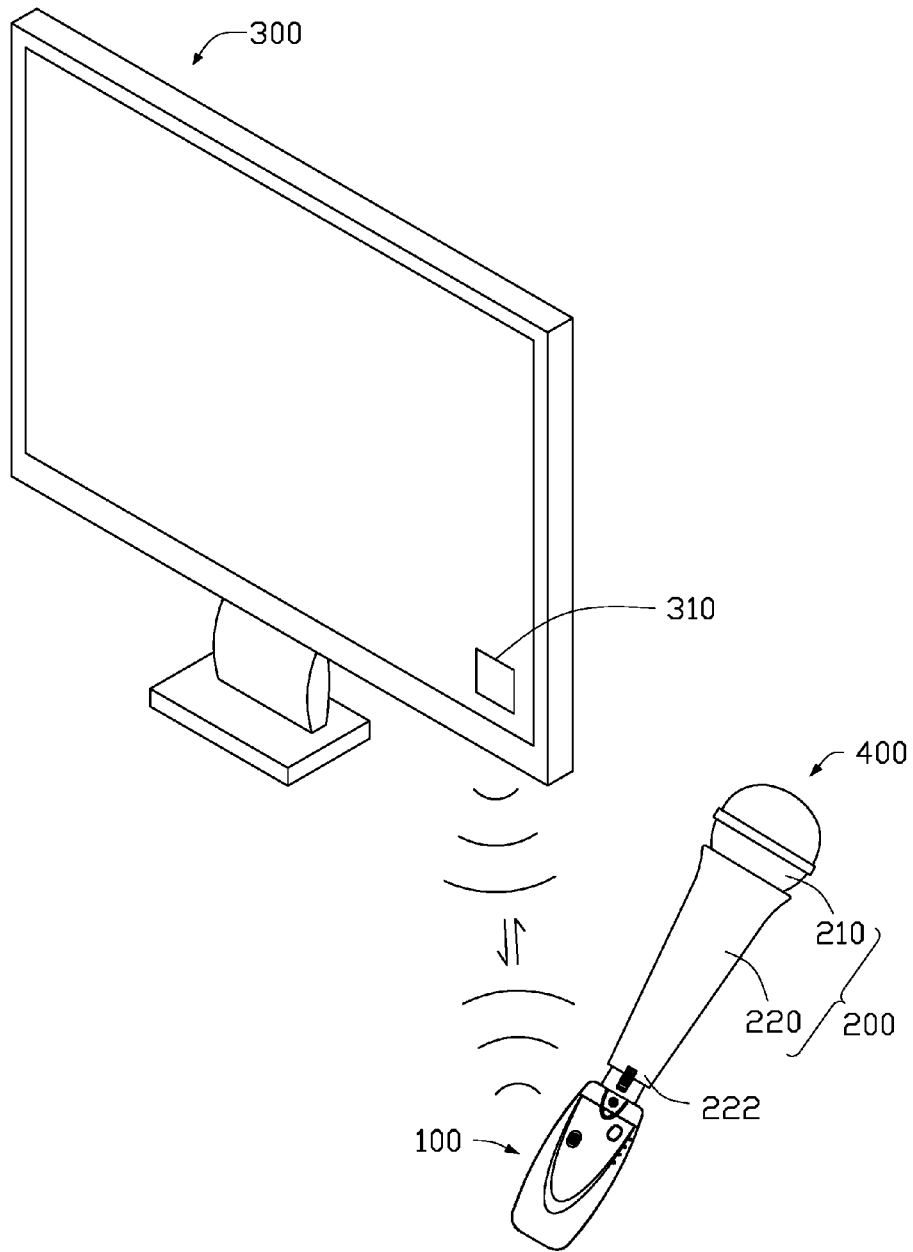
FIG. 1 is an isometric view of an embodiment of a wireless microphone, including a wireless joint.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to A wireless joint comprises a converter, a radio frequency (RF) device, and a connector. The converter realizes a conversion between an audio signal and a wireless signal. The RF device receives and transmits the wireless signal. The connector connects with a microphone body.

FIG. 1 illustrates wireless microphone 400 of a first embodiment. The wireless microphone 400 including a wireless joint 100 and a microphone body 200. The wireless microphone 400 is wirelessly connected with an electronic apparatus 300. The electronic apparatus 300 can be a television, a stereo, and the like. The electronic apparatus 300 includes a wireless transceiver 310, wirelessly connected with the wireless joint 100 of the wireless microphone 400.

The microphone body 200 includes a mash head 210 and a handle 220. The mash head 210 is connected to an end of the handle 220. A first connecting portion 222 is located at another end of the handle 220 opposite to the mash head 210. In one embodiment, the first connecting portion 222 includes a wire connector (not shown) to make cable connection and wireless connection selectively for user.

Figure 2:
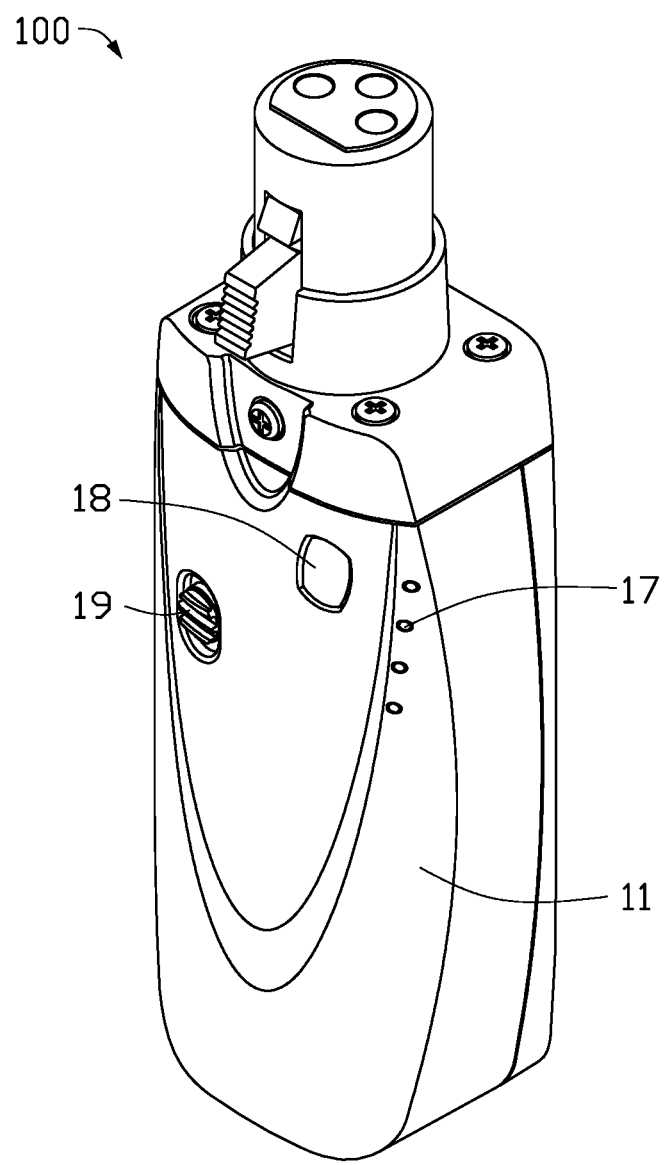
FIG. 2 is an isometric view of a first embodiment of the wireless joint of FIG. 1.
Figure 3:
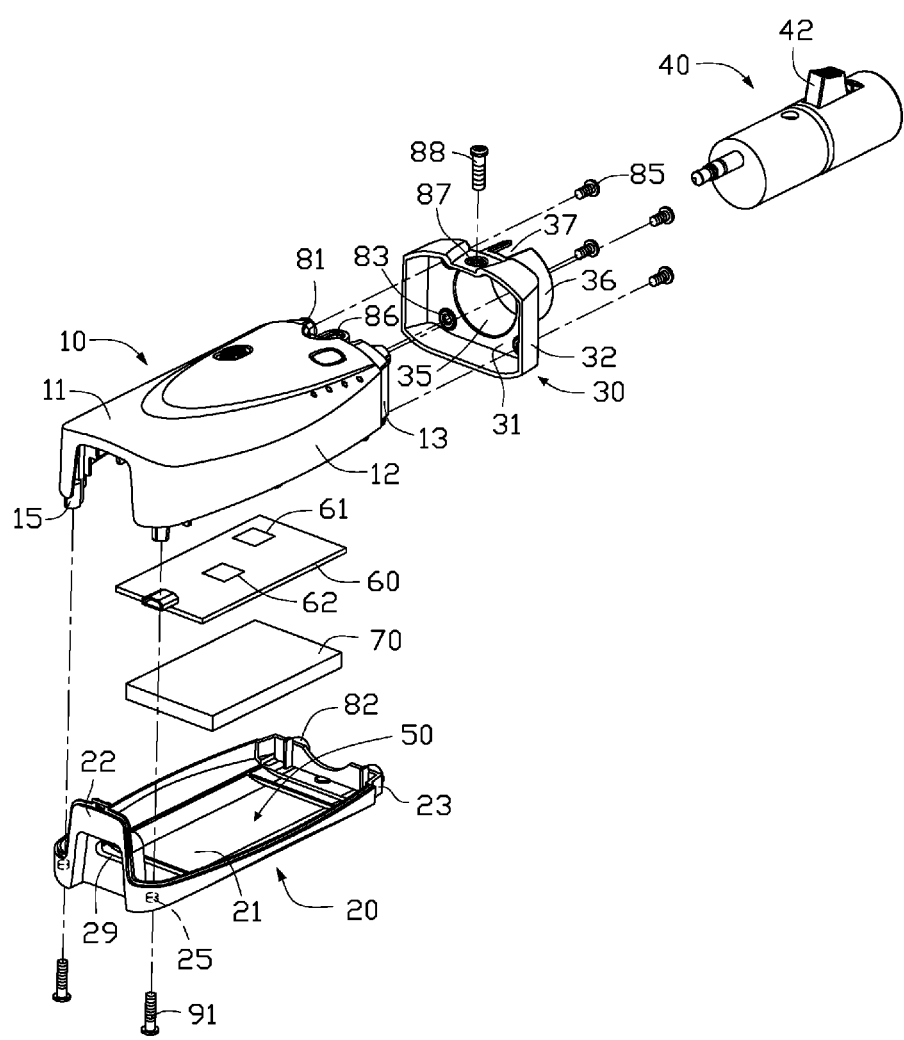
FIG. 3 is an exploded view of the wireless joint of FIG. 2.

Referring to FIGS. 2 and 3, the wireless joint 100 includes a front cover 10, a rear cover 20, a top cover 30, and a second connecting portion 40. The front cover 10 and the rear cover 20 are fastened with each other and cooperatively define a hollow cavity 50. The hollow cavity 50 is configured to receive a circuit board 60 and a battery 70 of the wireless joint 100. The second connecting portion 40 is inserted on the top cover 30. The circuit board 60 and the first connecting portion 222 of the microphone body 200 are electrically connected with each other by the second connecting portion 40. The battery 70 is a power supply for the circuit board 60. The circuit board 60 includes a converter 61 and a Radio Frequency (RF) device 62. The converter 61 realizes conversion between an audio signal and a wireless signal. The RF device 62 wirelessly connects with the wireless transceiver 310 of the electronic apparatus 300. The wireless signal is transmitted between the wireless transceiver 310 and the RF device 62, therefore realizing the wireless function of the wireless microphone 400.

The front cover 10 includes a front plate 11. The front plate 11 is substantially a rectangle. Two side plates 12 extend perpendicularly from two long edges of the front plate 11 respectively. A first extending portion 13 extends from a short edge of the front plate 11, along a direction parallel to the long edges of the front plate 11. The rear cover 20 includes a rear plate 21. The rear plate 21 is substantially similar to the front plate 11. A second extending portion 23 extends from a short edge of the rear plate 21. The second extending portion 23 corresponds to the first extending portion 13. A side plate 22 extends perpendicularly from another short edge of the rear plate 21 opposite to the second extending portion 23. Each side plate 12 of the front cover 10 is fixedly connected to a long edge of the rear cover 20 respectively. A short edge of the front plate 11 opposite to the first extending portion 13 is fixedly connected to the side plate 22 of the rear cover 20. The first extending portion 13 of the front cover 10 is fixed connected to the second extending portion 23 of the rear cover 20. Therefore the hollow cavity 50 is defined.

In one embodiment, two studs 15 are defined at two junctions of the short edge of the front plate 11, opposite to the first extending portion 13, and two long edges of the front plate 11. Two screw holes 25 are defined at two junctions of the short edge of the rear plate 21, opposite to the second extending portion 23, and two long edges of the rear plate 21. Each of the screw holes 25 corresponds to a stud 15. Two bolts 91 pass through the screw holes 25 and corresponding studs 15 to fixedly connect the front cover 10 to the rear cover 20.

The top cover 30 includes a top plate 31. Four side plates 32 extend perpendicularly from edges of the top plate 31. The top plate 31 and four side plates 32 cooperatively form a cover, configured to cover the fixedly connected first extending portion 13 and second extending portion 23. In one embodiment, after the top cover 30 covered the first extending portion 13 and the second extending portion 23, outer surfaces of the four side plates 32, the front plate 11, the side plate 12, and the rear plate 21 cooperatively form a smooth surface. The top plate 31 defines an opening 35. The opening 35 is substantially a circular. A hollow extending portion 36 extends from the top plate 31 along a direction away from the four side plates 32. The hollow extending portion 36 is coupled with the opening 35. The opening 35 and the hollow extending portion 36 are configured to let the second connecting portion 40 pass through.

In one embodiment, the second connecting portion 40 includes clamping part 42. The clamping part 42 clamps with the handle 220 when connecting the second connecting portion 40 to the first connecting portion 222. The hollow extending portion 36 defines a gap 37. The gap 37 is configured to receive the clamping part 42.

In one embodiment, two studs 81 are defined at two corners of the first extending portion 13 along a direction parallel to a extending direction of the first extending portion 13. Two studs 82 are defined at two corners of the second extending portion 23 along a direction parallel to a extending direction of the second extending portion 23. Four screw holes 83 are defined on the top plates 31. Each screw hole 83 corresponds to a stud 81 or a stud 82. Four bolts 85 pass through the four screw holes 83 and the studs 81 and 82 respectively, therefore fixedly connecting the top cover 30 to the front cover 10 and the rear cover 20. In addition, a stud 86 is defined between the two studs 82. The stud 86 extends along a direction perpendicular to the front plate 11. A screw hole 87 is defined on one side plate 32 of the top cover 30. The screw hole 87 corresponds to the stud 86. A bolt 88 passes through the screw hole 87 and the stud 86 to fixedly connect the top cover 30 to the front cover 10.

In one embodiment, the battery 70 is a rechargeable battery. A charging port 29 is defined on the side plate 22.

The wireless joint 100 further includes a power button 19, a wireless connecting button 18, and a plurality of light emitting diodes 17. The power button 19 is configured to control a power supply from the battery 70 to the circuit board 60. The wireless connecting button 18 is configured to let the RF device 62 send a matching signal to and match with the wireless transceiver 310, so as to wireless connect the RF device 62 and the wireless transceiver 310. The light emitting diodes 17 are configured to show a working state of the wireless joint 100, such as power on, matching success, power of the battery, charging status, and so on.

When working, the power button 19 is pressed down, the battery 70 supplies power to the circuit board 60. When the wireless connecting button 18 is pressed down, the RF device 62 sends a matching signal to and matches with the wireless transceiver 310. An audio signal passes through the first connecting portion 222, the second connecting portion 40 and arrives at the circuit board 60. The converter 61 converts the audio signal to a wireless signal. The wireless signal is sent to the wireless transceiver 310 by the RF device 62.

Figure 4:
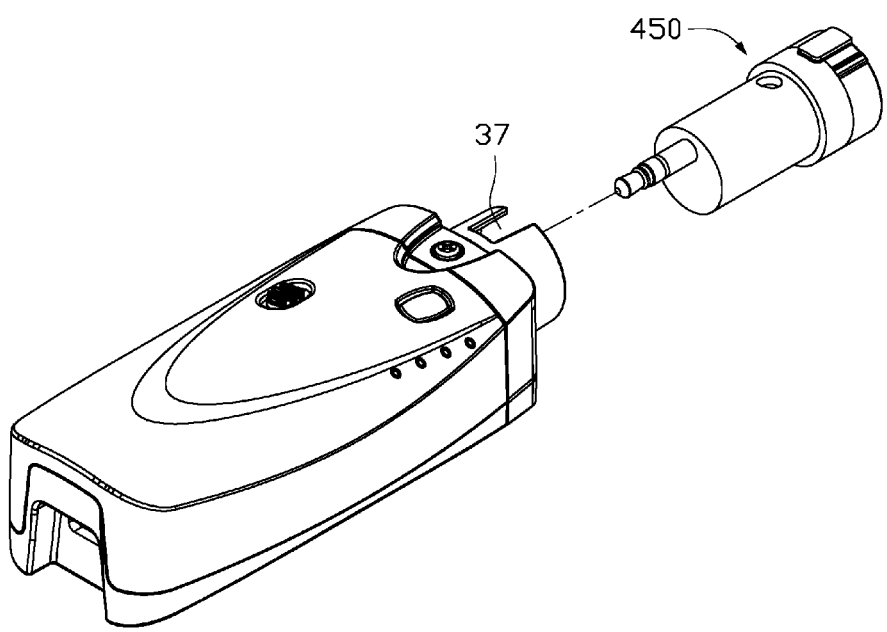
FIG. 4 is an isometric view of a second embodiment of the wireless joint of FIG. 1.
Figure 5:
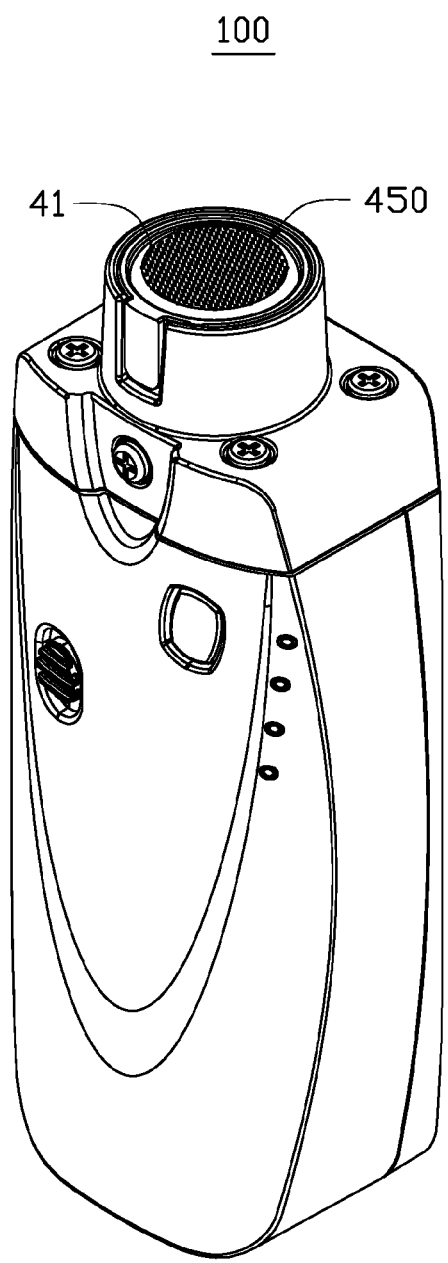
FIG. 5 is another isometric view of the wireless joint of FIG. 4.

Referring to FIGS. 4 and 5 illustrate a second embodiment of the wireless microphone 400. The wireless microphone 400 of the second embodiment is substantially similar to the wireless microphone 400 of the first embodiment. In a subsequent description of the wireless microphone 400 of the second embodiment, same element has a same label as in the first embodiment, and the subsequent description is about a difference between the wireless microphone 400 of the second embodiment and the wireless microphone 400 of the first embodiment.

In the second embodiment, the second connecting portion 40 is replaced with a radio structure 450. The radio structure 450 is inserted into the hollow extending portion 36 and is electrically connected to the circuit board 60. In one embodiment, the radio structure 450 includes a net portion 451. The net portion 451 is configured to let voice pass through. The radio structure 450 is configured to convert the voice to audio signal and transmit the audio signal to the circuit board 60. In this case, the wireless joint 400 is substantially a wireless microphone.

The embodiments shown and described above are only examples. Many details are often found in the art such as the other features of a wireless microphone. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the embodiments described above may be modified within the scope of the claims.

What is claimed is:
1. A wireless joint comprising:
a converter, realizing a conversion between an audio signal and a wireless signal;
a radio frequency (RF) device, receiving and transmitting the wireless signal; and
a connector for connecting with a microphone body;
a front cover;
a rear cover, and a top cover fixedly connected to the front cover and rear cover, wherein the front cover and the rear cover cooperatively form a hollow cavity wherein the converter and radio frequency device are fixedly mounted within the hollow cavity, and wherein the front cover comprises a front plate, two side plates extend respectively perpendicularly from two long edges of the front plate, a first extending portion extends from a short edge of the front plate; the rear cover comprises a rear plate, a second extending portion extends from a short edge of the rear plate, the second extending portion corresponds to the first extending portion, a side plate extends perpendicularly from another short edge of the rear plate opposite to the second extending portion, the side plates of the front cover are fixedly connected to long edges of the rear plate respectively, another short edge of the front cover is fixedly connected to the side plate of the rear cover, the first extending portion is fixedly connected to the second extending portion; and wherein the top cover comprises a top plate, four side plates extend perpendicularly from edges of the top plate, the top plate and four side plates cooperatively form the top cover to cover the fixedly connected first extending portion and second extending portion.

2. The wireless joint of claim 1, further comprising a circuit board received in the hollow cavity, wherein the converter and the RF device are both arranged on a circuit board.

3. The wireless joint of claim 2, further comprising a battery, wherein the battery is received in the hollow cavity and is configured for be a power supply for circuit board.

4. The wireless joint of claim 3, wherein the battery is a rechargeable battery.

5. The wireless joint of claim 2, wherein the connector is fixed on the top cover and is electrically connected to the circuit board.

6. The wireless joint of claim 1, wherein a charging port is defined at the side plate of the rear cover.

7. The wireless joint of claim 1, wherein two studs are defined at two junctions of the short edge of the front plate, opposite to the first extending portion, and two long edges of the front plate, two screw holes are defined at two junctions of the short edge of the rear plate, opposite to the second extending portion, and two long edges of the rear plate, each of the screw holes corresponds to a stud, two bolts pass through the screw holes and corresponding studs respectively to fixedly connect the front cover to the rear cover.

8. The wireless joint of claim 1, wherein the top plate define an opening, a hollow extending portion extends from the top plate along a direction away from the four side plate, and the hollow extending portion is coupled with the opening, and the connector passes through the opening and hollow extending portion.

9. The wireless joint of claim 8, wherein the connector comprises a clamping part, the clamping part clamps with the microphone body.

10. The wireless joint of claim 9, wherein the hollow extending portion defines a gap, the clamping part is received in the gap.

11. The wireless joint of claim 1, wherein two studs are defined at two corners of the first extending portion along a direction parallel to a extending direction of the first extending portion, two studs are defined at two corners of the second extending portion along a direction parallel to a extending direction of the second extending portion, four screw holes are defined on the top plate, four bolts pass through the four screw holes and the studs at the corners respectively, therefore fixedly connecting the top cover to the front cover and the rear cover.

12. The wireless joint of claim 11, wherein a additional stud is defined between the two studs at the corner of the front plate, the stud extends along a direction perpendicular to the front plate, an additional screw hole is defined on one side plate of the top cover, the additional screw hole corresponds to the additional stud, a bolt passes through the additional screw hole and the additional stud to fixedly connect the top cover to the front cover.

13. A wireless microphone comprising:
a microphone body, comprising a first connecting portion, configured to transmit an audio signal;
a wireless joint comprising a converter, a radio frequency (RF) device, a second connecting portion, a front cover, a rear cover, and a top cover fixedly connected to the front cover and rear cover, wherein the front cover and the rear cover cooperatively form a hollow cavity wherein the converter and radio frequency device are fixedly mounted within the hollow cavity, and wherein the front cover comprises a front plate, two side plates extend respectively perpendicularly from two long edges of the front plate, a first extending portion extends from a short edge of the front plate, the rear cover comprises a rear plate, a second extending portion extends from a short edge of the rear plate, the second extending portion corresponds to the first extending portion, a side plate extends perpendicularly from another short edge of the rear plate opposite to the second extending portion, the side plates of the front cover are fixedly connected to long edges of the rear plate respectively, another short edge of the front cover is fixedly connected to the side plate of the rear cover, the first extending portion is fixedly connected to the second extending portion, wherein the converter realizes a conversion between an audio signal and a wireless signal, the RF device receives and transmits the wireless signal, the second connecting portion is electrically connected with the first connecting portion; and wherein the top cover comprises a top plate, four side plates extend perpendicularly from edges of the top plate, the top plate and four side plates cooperatively form the top cover to cover the fixedly connected first extending portion and second extending portion.

* * * * *